US006615536B2

United States Patent
Carvin

(10) Patent No.: US 6,615,536 B2
(45) Date of Patent: Sep. 9, 2003

(54) ARTIFICIAL PINE NEEDLE

(76) Inventor: David Carvin, 115 Hunters Glen, Thomasville, GA (US) 31792

( * ) Notice: Subject to any disclaimer, the term of this patent is extended or adjusted under 35 U.S.C. 154(b) by 0 days.

(21) Appl. No.: 09/816,711

(22) Filed: Mar. 23, 2001

(65) Prior Publication Data

US 2002/0134009 A1 Sep. 26, 2002

(51) Int. Cl.$^7$ ............................................... C09K 17/52
(52) U.S. Cl. ................................................. 47/9; 248/17
(58) Field of Search ..................... 47/9, 1.01 R; 428/15, 428/17, 18, 358; 119/171, 172, 173

(56) References Cited

U.S. PATENT DOCUMENTS

| | | | | |
|---|---|---|---|---|
| D161,913 S | * | 2/1951 | Fraim ................... 47/1.01 R X |
| 3,565,831 A | * | 2/1971 | Detert ........................ 428/905 |
| 3,566,440 A | * | 3/1971 | Romanowski et al. |
| 4,171,401 A | | 10/1979 | Legriz et al. |
| 4,676,856 A | * | 6/1987 | Shigeki et al. |
| 4,855,166 A | * | 8/1989 | Allison ........................ 428/15 |
| 5,105,577 A | | 4/1992 | Hedges |
| 5,171,615 A | * | 12/1992 | Cohen et al. ................. 156/61 |
| 5,330,804 A | | 7/1994 | Allison et al. |
| 5,429,073 A | | 7/1995 | Ballard |
| 5,910,514 A | | 6/1999 | Greenberg et al. |
| 6,251,410 B1 | * | 6/2001 | Schiraldi et al. ............ 424/401 |
| 2002/0134009 A1 | * | 9/2002 | Carvin ............................ 47/9 |

FOREIGN PATENT DOCUMENTS

| | | | |
|---|---|---|---|
| EP | 1136637 A1 | * | 9/2001 |
| GB | 2239796 A | * | 7/1991 |
| JP | 10-225324 | * | 8/1998 |
| JP | 11-348498 | * | 12/1999 |

* cited by examiner

Primary Examiner—Peter M. Poon
Assistant Examiner—Jeffrey L. Gellner
(74) Attorney, Agent, or Firm—Brian D. Bellamy

(57) ABSTRACT

An artificial pine needle used as a synthetic ground cover comprised of an extruded monofilament strand having a substantially C-shaped cross section. The artificial pine needle consists of a blend of polyolefin resin material, such as biodegradable recycled polypropylene, and additive for imparting proper color, luster, and effective resistance to ultraviolet radiation. Additional concentrates may be added for imparting scents such as pine or citronella, and coatings on the inward surface of the artificial needle may be applied to provide a means for delivering fertilizers or pesticides.

17 Claims, 2 Drawing Sheets

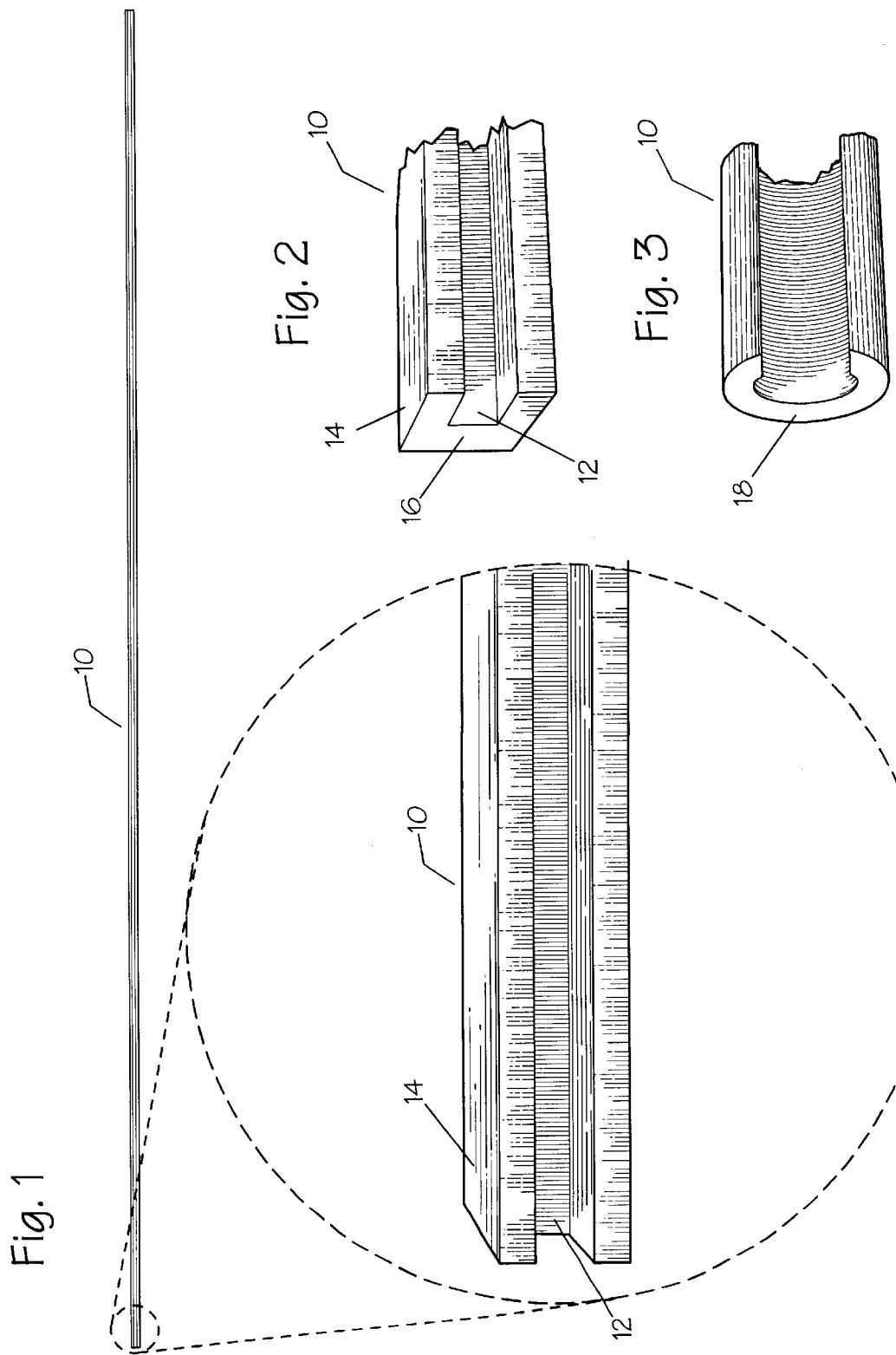

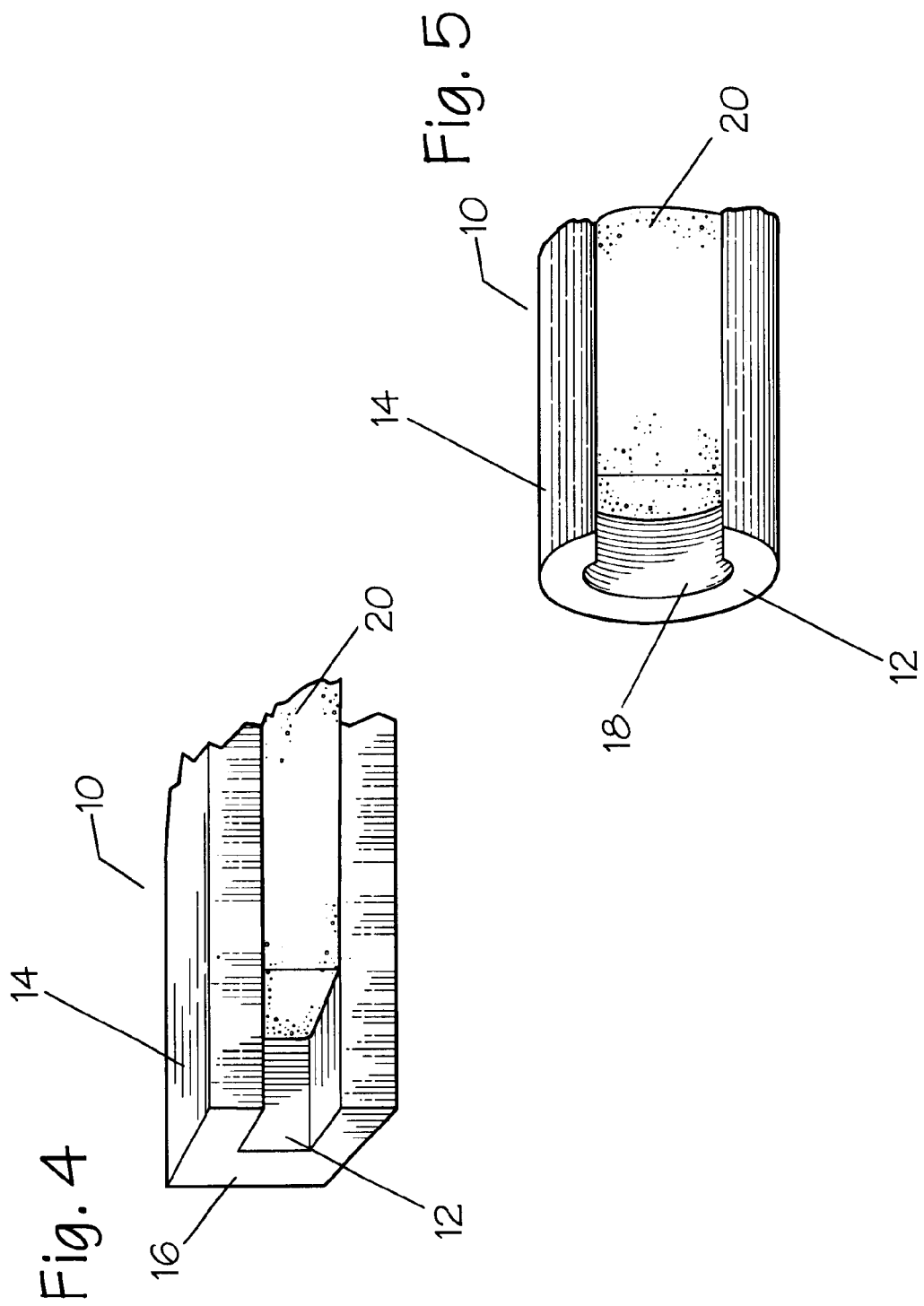

ARTIFICIAL PINE NEEDLE

BACKGROUND OF THE INVENTION

The present invention relates to artificial ground coverings and, more particularly, to an artificial pine needle for use as a ground cover.

Pine needles are used in gardening and landscape design and maintenance as a ground cover to protect vegetation from the elements, suppress weed growth, provide moisture retention, and provide an evaporation barrier. Further, pine needles are valued for their fresh reddish-brown or yellowish-brown colors during the spring and fall. However, the use of pine needles is limited in availability because of the geography where pine trees providing such pine needles grow and the costs of transporting pine needles.

In addition to the pure economics of using of natural pine needles, other factors influence the desirability of natural pine needles. Foremost, natural pine needles deteriorate rapidly as a result of aging, ultraviolet exposure, and weather. Within 60 to 90 days, natural pine straw begins to lose its color and appearance of freshness and becomes drab and unattractive. With the loss of color, natural pine needles also lose their natural fragrance that is so pleasing. Further, as the straw ages and becomes mildewed and rotten it becomes more difficult to fluff the straw and clean out any leaves and twigs. Alas, natural pine straw must be replaced frequently, every few months, to maintain its fresh appearance and odor.

Besides the material cost for the straw, which is labor intensive to gather in the first instance, applying straw to a bed of vegetation is labor intensive and costly. Often as a cost cutting measure, the old straw is left on the ground, and new straw is applied over the old. However, the presence of deteriorating old straw has disadvantages in that the old straw retains excess moisture keeping that moisture from the soil. Thus, the old straw may impair the proper root growth of the vegetation causing the roots to seek the moisture locked in the deteriorated straw.

The disadvantages of natural straw shown above can be overcome by the purchase of fresh straw and its labor intensive application. However, there are still further disadvantages of natural straw. For instance, natural straw is raked and gathered from the ground such that it contains contaminants such as sticks, leaves, and twigs. Natural straw may also carry molds, disease, bugs and insects, or weed and grass seeds that may be a nuisance to plants or the home. Finally, natural pine straw is very flammable and may cause the rapid spread of fire, rendering straw a fire hazard.

As an alternative to natural straw, synthetic straw has been considered. Synthetic straw is advantageous in that it is sterile when applied without contaminants or disease. After application as a ground cover, leaves and twigs may be removed from the synthetic straw by fluffing. Fluffing is the process of lifting the straw up and shaking it out again, whereby, the leaves and twigs in the straw become hidden and can decompose. The fluffing process is difficult with mildewed or rotten natural pine straw. Whereas, synthetic straw does not rot and decomposes very slowly with exposure to the ultraviolet rays from sunlight.

Therefore, it can be seen that a need exists for an alternative to natural pine straw for use as a ground cover and that a synthetic pine straw would be desirable. Several attempts have been made to provide synthetic ground coverings, but these ground coverings have been too shiny, hard, irregularly shaped, or generally artificial in appearance. U.S. Pat. No. 4,855,166 to Allison provides an artificial pine needle that includes a plurality of strands attached together to emulate the appearance of a natural pine needle. However, the process of binding the strands is expensive and the artificial attachment of the strands detracts from the pine needle's natural appearance.

OBJECTS OF THE INVENTION

Therefore, it is a primary object of the present invention to provide an artificial pine needle having similar characteristics to a natural pine needle.

It is another object of the present invention to provide an artificial pine needle that may be produced easily and inexpensively.

It is another object of the present invention to provide an artificial pine needle that will promote the proper drainage of water into the soil beneath bedded plants.

It is another object of the present invention to provide an artificial pine needle that will exceed the life of natural pine needles as a ground cover.

It is still a further object of the present invention to provide an artificial pine needle that is free of contaminants and that may assist in the application of fertilizer and pesticides to bedded plants.

It is yet a further object of the present invention to provide an artificial pine needle which provides a pleasant odor.

SUMMARY OF THE INVENTION

The present invention relates to synthetic artificial pine straw needles comprised of a monofilament strand of synthetic material. The monofilament strand is molded and extruded through a die during manufacture such that the artificial pine straw needle has a substantially C-shaped or U-shaped cross sectional shape, providing an artificial pine straw closely resembling the appearance of natural pine needles. Further, the C-shaped or U-shaped cross section provide maximum surface area on the artificial pine needle for providing ground cover, while the material usage in the construction of the artificial pine needle is reduced. The C-shaped or U-shaped cross section gives substantial costs savings on raw materials used in manufacture compared to an artificial pine needle having a circular or cube shaped cross section.

The monofilament strand of the present invention primarily comprises a polyolefin resin which makes up 80 percent or more of the weight of the strand. Because the structural properties of an artificial pine needle are not critical, the monofilament may comprise a polyolefin consisting of recycled polypropylene homopolymer. In particular, the artificial pine needle of the invention may consist of 80 percent or more by total weight of recycled polypropylene blended with 20 or less percent by total weight of an additive blend that imparts desirable characteristics of color, scent, and durability to the product.

In general, the additive may include a ultraviolet inhibitor to enhance the life of the artificial pine needle and pigment and calcium carbonate to provide suitable color and limited luster. The inventor has found that an additive providing to the to the total weight of the blend about 0.1 to 0.2 percent by weight of ultraviolet inhibitor, 0.15 percent by weight of iron oxide/carbon pigments, and about 15 to 20 percent by weight of calcium carbonate in a polyethylene carrier resin provides excellent quality artificial pine straw with appropriate color and luster. The ultraviolet inhibitor permits the artificial pine needles to last for two years or more before needing to be replaced.

In addition to the standard artificial pine needle, several additional additives may be included to impart desirable characteristics. For instance, a citronella concentrate oil may be added to the additive such that the artificial pine needle will have a pleasant scent and ward off mosquitoes. Likewise, a pine scent or fresh flower scent could be added to the additive blend. A fragrance or the like embodied within a monofilament strand like that in the present invention will be released in proportion to the external surface area of the monofilament strand. The C-shaped or U-shaped artificial pine needle maximizes the available external surface area. Therefore, the invention provides advantages in the release of fragrances or other chemicals that are embodied within the artificial pine needle.

The inward surface area of the C-shaped or U-shaped artificial pine needle provides an excellent surface for carrying additional additives that may be applied on the exterior of the pine needle. The inward surface is ideal in that it is not as visible and additives thereon will not significantly effect the appearance of the artificial ground cover. Also, the inward surface of the C-shaped cross section provides a cavity for application of ample amounts of any such additive. As a result, the inward exterior surface of the artificial pine needle is well suited for coating of the surface with a fertilizer or pesticide. Therefore, in one process of manufacture a ground covering may be provided that also acts as a means for transmitting long-acting fertilizers or pesticides to bedding plants.

The process of fluffing artificial pine needles that have been set out as ground cover lengthens the expected life of the artificial straw. As described above, ultraviolet inhibitors are added to extend the life of the artificial straw to exceed two years, but with fluffing and shade the actual life of the artificial straw may be considerably longer. Over time, some fading of the artificial straw will occur. When the artificial pine needles disclosed herein are removed as a ground covering, the artificial needles may be thrown away with other yard trash and disposed of without harm to the environment. Further, the residual decomposed material left in the beds will gradually reduce to the base materials the artificial needles are comprised of which are environmentally harmless.

The present invention includes method of manufacture of artificial pine needles having a substantially C-shaped or U-shaped cross section. The method of manufacture comprises the steps of blending a resin and additives in which the resin is a polyolefin substance such as recycled polypropylene. The additive will preferably consist of a polyethylene carrier, pigment, calcium carbonate, and an ultraviolet inhibitor. The blend is extruded into monofilaments through a C-shaped or U-shaped die.

BRIEF DESCRIPTION OF DRAWINGS

FIG. 1 is a perspective view showing an artificial pine needle of the present invention having a portion thereof enlarged for illustration.

FIG. 2 is a partial perspective view showing one end of the pine needle of FIG. 1 to illustrate one embodiment of the invention.

FIG. 3 is a partial perspective view showing one end of an artificial pine needle to illustrate an alternative embodiment of the invention.

FIG. 4 is a partial perspective view showing an alternative form of the pine needle of FIG. 2.

FIG. 5 is a partial perspective view showing an alternative form of the pine needle of FIG. 3.

DESCRIPTION OF THE PREFERRED EMBODIMENTS

Referring now to the drawings and particularly to FIG. 1, an artificial pine needle 10 of the present invention is depicted as a single monofilament strand 10. A desired quantity of the single strand artificial pine needle 10 may be provided for use as an artificial pine straw ground covering. As shown in the drawings, the monofilament strand 10 is molded having a substantially C-shape or U-shape, such that the pine needle 10 has an inward surface 12 and an outward surface 14.

In FIG. 2 a pine needle 10 is shown having a U-shaped cross section 16, which also could be seen and referred to as a C-shaped cross section depending upon the orientation of the view. In FIG. 3 a pine needle 10 is shown having a C-shaped cross section 18. Thus, the cross sectional shape of the pine needle 10 will be referred to generally as C-shaped as depicted by the various embodiments illustrating a preferred embodiment of the invention. A primary advantage of the C-shaped construction of the invention is that the artificial pine needle 10 more closely resembles natural pine straw needles.

In either embodiment, the inward surface 12 of the pine needle 10 has a surface area that is less than the outward surface 14. However, the pine needles 10 depicted in both FIG. 2 and FIG. 3 have a total exposed circumference that is greater than a solid round monofilament strand of similar cross-sectional width. The greater exposed circumference of the C-shaped artificial pine needle provides several additional advantages to the present invention, besides more closely resembling natural straw.

The generally C-shaped monofilament strands require significantly less raw material usage in manufacture, resulting in cost savings while still providing the greater exposed surface area. The inward surface 12 is especially advantageous for the application of external coatings 20 such as pesticides, insecticides, or fertilizers in that a cavity is provided by the U-shaped or C-shaped cross sections 16 and 18 to hold such coatings in ample amount without effecting the overall appearance of the artificial pine needle 10. Therefore, during the process of manufacture after the monofilament strand is extruded, the inward surface 12 of the present artificial pine needle 10 may be coated with a fertilizer, pesticide or other composition 20 as shown in FIG. 4 and FIG. 5. In particular, the artificial pine needle 10 may be manufactured as a ground covering provided with a coating 20 of slow release fertilizer. Thereby, the artificial pine needle 10 disclosed may also act as a means for transmitting long-acting fertilizers, pesticides, or insecticides to bedding plants by coating the inward surface 12.

The base material for the construction of the artificial pine needle 10 in the figures is a synthetic thermoplastic material such as polyolefin. A base material's quality and properties such as strength and dimensional tolerances are normally critical in polyolefin products, but, in the case at hand, such material properties are not critically important for application in the production of artificial pine needles. Therefore, the base material for the artificial pine needle 10 may be a recycled polyolefin resin such as polypropylene. The base material may comprise greater than 90 percent recycled or off-grade resin without effecting the quality of the artificial pine needle 10. Using, recycled polypropylene is both advantageous to environment and less expensive.

In one embodiment of the invention, the monofilament strand forming the artificial pine needle 10 is comprised of 80 to 85 percent by total weight of a synthetic base material consisting of recycled film-grade 5 melt polypropylene homopolymer. The base material is blended with 15 to 20 percent by total weight of additive. Although a 5 melt polymer is taught, any polymer with an industry standard melt flow between 2 and 10 can be used in the extrusion process for creating an artificial pine needle 10 depending on cost and availability.

In the embodiment described, the additive consists of ultraviolet inhibitor comprising about 0.2 percent by weight of the monofilament strand, iron oxide/carbon pigments comprising about 0.15 percent of the total weight, and calcium carbonate comprising about 15 percent of the total weight. The additive ingredients are mixed with a polyethylene carrier comprising about 25 percent of the total additive weight. The additive is compounded into the polyolefin base material through the polyethylene carrier resin at the rate of about 15 to 20 pounds of additive per hundred pounds of base material. It will be apparent to one skilled in the art that any of the additive quantities may be varied somewhat according to the desired attributes of the artificial pine needle 10. For instance, the amount of ultraviolet inhibitor used to enhance the ability of the artificial pine needle 10 to withstand ultraviolet radiation may change depending on cost and effectiveness. The amount of calcium carbonate used to dull the finish of the straw may vary to up to 20 percent of total artificial pine needle's weight, depending on what is required for a particular color straw and amount of luster. Further, the amount and attributes of pigment used in the additive may vary depending upon brand or season. A red/brown pigment color or yellow/brown pigment color may be used according to the season or to vary the color of the artificial needle 10 according to preference.

Other variations of additives to the polyolefin base material could be considered, including in particular, adding citronella wax or oil to the base material to provide a repellant for mosquitoes and other pests. Alternatively, desirable scents may be added to the artificial pine needle 10 by adding concentrates during the manufacture of the product. A scent of pine or fresh flowers may be added to enhance the fragrance of the artificial pine needle 10. As described, the C-shaped or U-shaped artificial pine needle 10 maximizes the available external surface area by providing the inward surface 12. Therefore, since fragrances and the like are released in proportion to the external surface area, the invention provides advantages in the release of fragrances or other chemicals that are embodied within the artificial pine needle 10. In particular, a fragrance or the like embodied within the strand 10 will be released with greater effect because of the increase proportion to the external surface area of the strand 10.

During the process of manufacture, the polypropylene resin base and additive are separately added into a blender operating in combination with an extruding apparatus. The desired percentages by weight of base resin and additive to create the proper blend are input to the controls for the blender. Prior to extruding, a blending step occurs in which the base resin and additive mixture is combined. In one embodiment the blending step includes blending about 80 to 84 percent by weight of recycled polypropylene and about 16 to 20 percent by weight of additive, in which the additive comprises by the total weight of the blend about 0.2 percent ultraviolet inhibitor, about 0.15 percent pigment, about 15 percent calcium carbonate, and about 0.15 percent polyethylene.

Once the blending step is completed, the combined materials are extruded into a monofilament strand by dumping them into a hopper and feeding them into the throat of an extruding apparatus. The extruding apparatus consists of a barrel having a flited screw. Heating elements wrapped about the barrel heat the barrel to a temperature of 400–500 F., and a motor turns the screw which pushes the blended material through the heated barrel. The heat melts and further mixes the resin and additives. Pressure builds at the front of the extruding apparatus extruding the combined materials into monofilament.

A die is situated on the front of the extruding apparatus having the C-shape or U-shape described herein similar to the final cross sectional shape of the pine needle 10 shown in FIG. 2 and FIG. 3. The extruded monofilament is drawn from the die through a water bath which quenches the monofilament and then the water is removed. The monofilament is solidified having the C-shape and then cut into the pine needle strands 10. The size of the hole in the die, and the speed of the extruding process are adjusted to control the dimensions of the strands such that the strands are substantially the same in size as a natural pine needle.

It should be understood that other variations of the described invention will be apparent from the disclosure and fall within the scope of the claimed invention. In particular, other means for extruding the monofilament and other base materials for forming the monofilament can be substituted besides those detailed in the examples. Thus, the scope of the invention shall include all modifications and variations that may fall within the scope of the attached claims.

I claim:

1. An artificial pine needle comprising a strand being at least partially made of a synthetic material, said strand having an essentially C-shaped or U-shaped cross sectional shape that is longitudinally uniform and includes a substantially flat inward surface situated substantially along a first plane, a first extension situated substantially along a second plane, the first extension adjoining the inward surface at a first angled area in which the first plane and second plane intersect at an angle, a second extension situated substantially along a third plane, the second extension adjoining the inward surface at a second angled area in which the first plane and the third plane intersect at an angle, and said strand having substantially the same dimensions as natural pine straw and including pigment of red, brown, yellow or a combination or variety thereof.

2. An artificial pine needle as set forth in claim 1 wherein said synthetic material is a polyolefin resin.

3. An artificial pine needle as set forth in claim 2 wherein said polyolefin resin is recycled polypropylene.

4. An artificial pine needle as set forth in claim 1 wherein said strand includes an inward surface having a coating applied on the inward surface.

5. An artificial pine needle as set forth in claim 4 wherein said coating is a fertilizer.

6. An artificial pine needle as set forth in claim 4 wherein said coating is a pesticide or insecticide.

7. An artificial pine needle comprising a strand being at least partially made of over 80 percent by weight of synthetic material and about 20 percent or less by weight of an additive composition comprising am ultraviolet inhibitor, a pigment, calcium carbonate and polyethylene, and said strand having an essentially C-shaped or U-shaped cross sectional shape.

8. An artificial pine needle as set forth in claim 7 wherein said strand comprises about 0.2 percent by weight of said ultraviolet inhibitor, about 0.15 percent by weight of said pigment, about 15 to 20 percent by weight of said calcium carbonate, and about 0.15 percent by weight of said polyethylene.

9. An artificial pine needle as set forth in claim 7 wherein said additive composition further includes a concentrate for imparting a desirable scent to said artificial pine needle.

10. An artificial pine needle as set forth in claim 9 wherein said concentrate is citronella oil.

11. An artificial pine needle as set forth in claim 9 wherein said concentrate is pine scent.

12. A method for the manufacture of artificial pine needles comprising the steps of: blending polypropylene and an additive into a blend, extruding said blend into monofilaments through a die of C-shaped or U-shaped cross section at a determined rate of speed, adjusting the rate of speed of extruding said blend into said monofilaments, adjusting the die, and solidifying and cutting said monofilaments into strands having essentially C-shaped or U-shaped cross sectional shape and having substantially the same dimensions and color as natural pine straw or a pine needle.

13. A method for the manufacture of artificial pine needles as set forth in claim 12 wherein said step of blending includes preparing said additive by blending a polyethylene carrier with substances to enhance the color and durability of said artificial pine needles.

14. A method for the manufacture of artificial pine needles as set forth in claim 13 wherein said step of blending includes the addition of a concentrate for imparting a scent to said artificial pine needles.

15. A method for the manufacture of artificial pine needles as set forth in claim 14 wherein said concentrate is a citronella oil.

16. A method for the manufacture of artificial pine needles as set forth in claim 14 wherein said concentrate is a pine scent.

17. A method for the manufacture of artificial pine needles as set forth in claim 12 wherein said step of blending includes preparing said additive by blending a polyethylene carrier with calcium carbonate, an ultraviolet inhibitor, and a pigment.

\* \* \* \* \*